United States Patent
McCollough et al.

(10) Patent No.: US 8,882,024 B1
(45) Date of Patent: Nov. 11, 2014

(54) ROTORCRAFT ANTI-TORQUE ROTOR AND RUDDER SYSTEM

(71) Applicant: Bell Helicopter Textron Inc., Fort Worth, TX (US)

(72) Inventors: James M. McCollough, Arlington, TX (US); Tommie L. Wood, Pantego, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 13/924,990

(22) Filed: Jun. 24, 2013

(51) Int. Cl.
*B64C 27/82* (2006.01)

(52) U.S. Cl.
CPC ........................... *B64C 27/82* (2013.01)
USPC ...................... 244/17.19; 244/17.21

(58) Field of Classification Search
USPC .................. 244/17.19, 17.21, 17.27, 17.11, 6
See application file for complete search history.

(56) References Cited

U.S. PATENT DOCUMENTS

| | | | |
|---|---|---|---|
| 2,609,053 A | 9/1946 | Lee | |
| 2,413,625 A | 12/1946 | Hays | |
| 2,601,463 A | 6/1952 | Stanley | |
| 2,630,984 A | 3/1953 | Ballauer | |
| 3,426,982 A | 2/1969 | Markwood | |
| 3,432,119 A | 10/1969 | Miller | |
| 4,506,849 A | 3/1985 | Lemont | |
| 4,708,305 A * | 11/1987 | Kelley et al. | 244/17.19 |
| 4,928,907 A | 5/1990 | Zuck | |
| 4,948,064 A * | 8/1990 | Richard | 242/423.2 |
| 5,108,044 A * | 4/1992 | Weiner et al. | 244/17.19 |
| 5,209,430 A * | 5/1993 | Wilson et al. | 244/17.19 |
| 5,251,847 A * | 10/1993 | Guimbal | 244/17.19 |
| 5,388,785 A * | 2/1995 | Rollet et al. | 244/17.19 |
| 5,607,122 A | 3/1997 | Hicks et al. | |
| 5,634,611 A * | 6/1997 | Marze et al. | 244/17.19 |
| 5,645,249 A * | 7/1997 | Hein | 244/49 |
| 5,649,678 A * | 7/1997 | Nurick | 244/17.19 |
| 5,738,301 A * | 4/1998 | Francois et al. | 244/17.19 |
| 6,053,452 A | 4/2000 | Yamakawa et al. | |
| 6,086,016 A | 7/2000 | Meek | |
| 6,290,171 B1 | 9/2001 | Dequin et al. | |
| 7,178,757 B1 | 2/2007 | Breese | |
| 7,461,819 B2 * | 12/2008 | Eglin | 244/195 |

(Continued)

FOREIGN PATENT DOCUMENTS

| | | |
|---|---|---|
| EP | 0867364 | 9/1998 |
| GB | 2072601 | 10/1981 |

OTHER PUBLICATIONS

Office Action in Related U.S. Appl. No. 13/925,008, dated Jun. 26, 2014, 11 pages.

(Continued)

*Primary Examiner* — Christopher P Ellis
(74) *Attorney, Agent, or Firm* — Christopher S. Storm

(57) ABSTRACT

According to one embodiment, a rotorcraft includes a main rotor system, an anti-torque rotor system, an anti-torque rotor enhancement system, and an anti-torque rudder system. The anti-torque rotor enhancement system includes an aerodynamic structure having an opening therethrough and a support structure coupling the aerodynamic structure to the body of the rotorcraft such that the opening is positioned proximate to a rotation path of the at least one anti-torque rotor blade. The anti-torque rudder system includes at least one rudder surface operable to provide a second force on the body in the direction of rotation of the at least one main rotor blade.

17 Claims, 6 Drawing Sheets

(56) References Cited

U.S. PATENT DOCUMENTS

| | | |
|---|---|---|
| 7,731,121 B2 * | 6/2010 | Smith et al. .................. 244/17.19 |
| 7,806,372 B2 | 10/2010 | Boczar et al. |
| 8,430,353 B2 * | 4/2013 | Botich ....................... 244/17.19 |
| 8,752,786 B2 | 6/2014 | Sonneborn |
| 2007/0295857 A1 | 12/2007 | Lloyd |
| 2008/0237392 A1 | 10/2008 | Piasecki et al. |
| 2010/0127114 A1 | 5/2010 | Nakayama et al. |
| 2012/0153072 A1 | 6/2012 | Elgin et al. |
| 2012/0280079 A1 | 11/2012 | Brand et al. |
| 2012/0312915 A1 | 12/2012 | Sonneborn |
| 2013/0175386 A1 | 7/2013 | Raffel et al. |
| 2013/0327896 A1 | 12/2013 | Mezan |

OTHER PUBLICATIONS

Search Report in Related European Patent Application No. 14150750.9, dated Aug. 22, 2014, 3 pages.

Search Report in Related European Patent Application No. 14150751.7, dated Aug. 22, 2014, 3 pages.

Examination Report in Related European Patent Application No. 14150750.9, dated Sep. 9, 2014, 7 pages.

Search Report in Related European Patent Application No. 14150751.7, dated Sep. 9, 2014, 6 pages.

* cited by examiner

US 8,882,024 B1

ROTORCRAFT ANTI-TORQUE ROTOR AND RUDDER SYSTEM

TECHNICAL FIELD

This invention relates generally to rotorcraft anti-torque systems, and more particularly, to a rotorcraft anti-torque rotor and rudder system.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

Rotorcraft may include, but are not limited to, tiltrotor aircraft, helicopters, or autogyros. Rotorcraft may be manned or unmanned aircraft. Manned rotorcraft may be commanded by a pilot. Unmanned rotorcraft may be commanded by a ground control station (GCS) operator or flight control box (FCB) operator. Rotorcraft may, for example, take off and land vertically, move horizontally, or hover in place.

SUMMARY

Particular embodiments of the present disclosure may provide one or more technical advantages. A technical advantage of one embodiment may include the capability to reduce tail-rotor noise. A technical advantage of one embodiment may also include the capability to improve anti-torque performance at higher airspeeds. A technical advantage of one embodiment may also include the capability to improve efficiency and safety of a tail rotor.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1A:
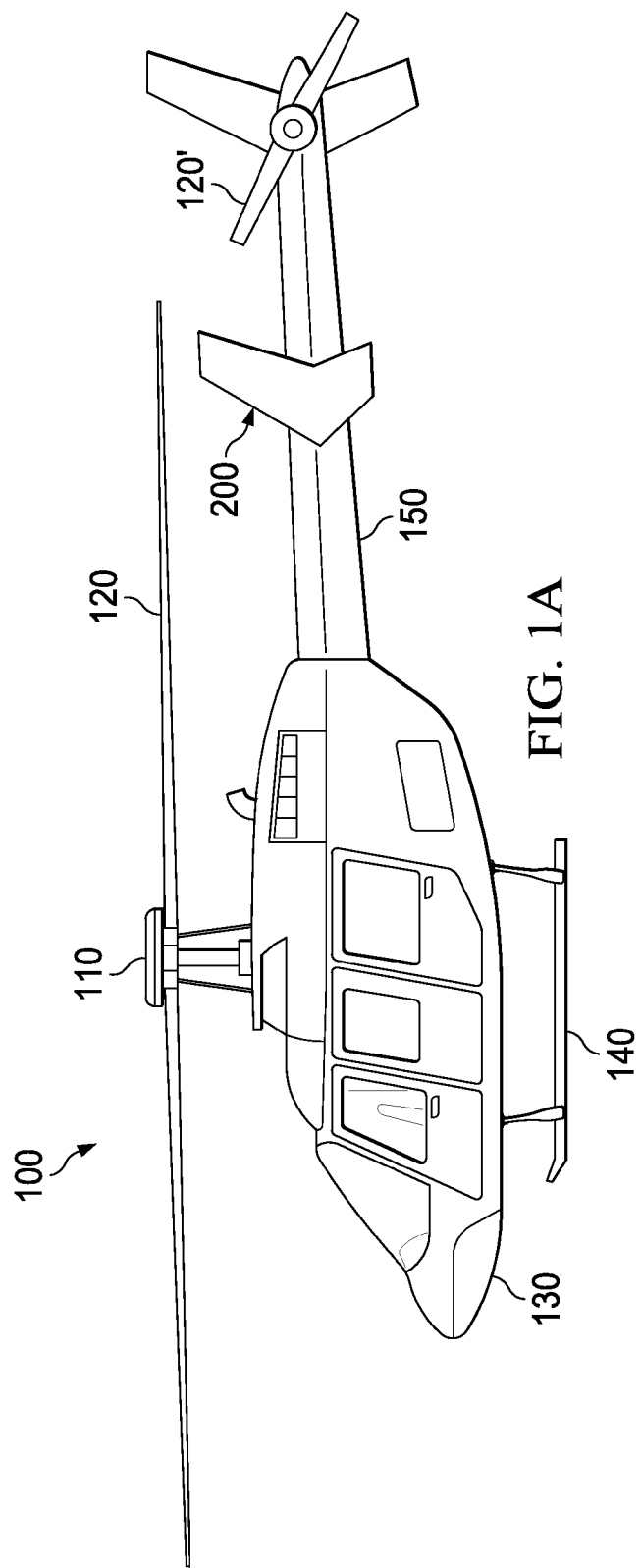
FIG. 1A shows a side view of a rotorcraft.
Figure 1B:
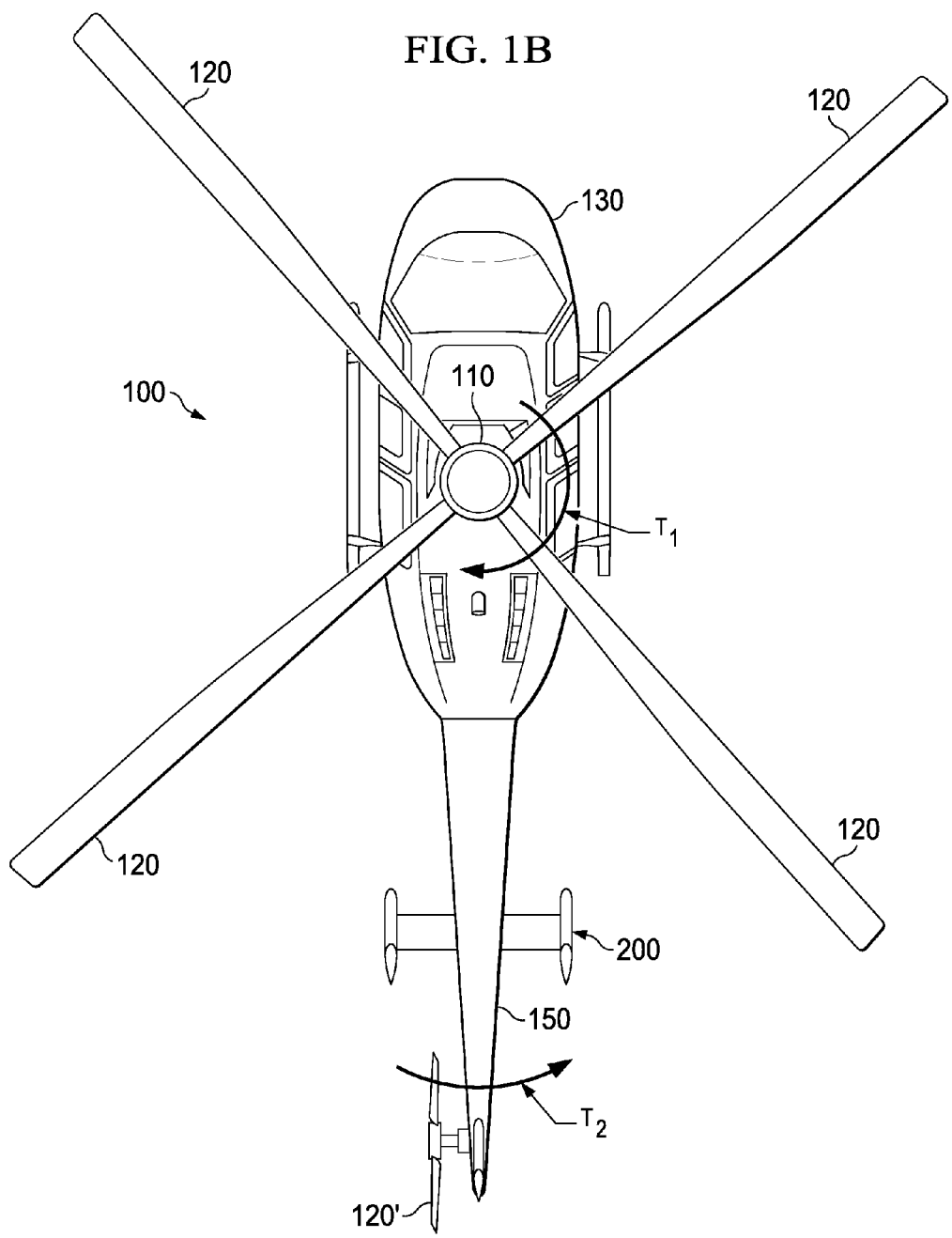
FIG. 1B shows a top view of the rotorcraft of FIG. 1A.
Figure 1C:
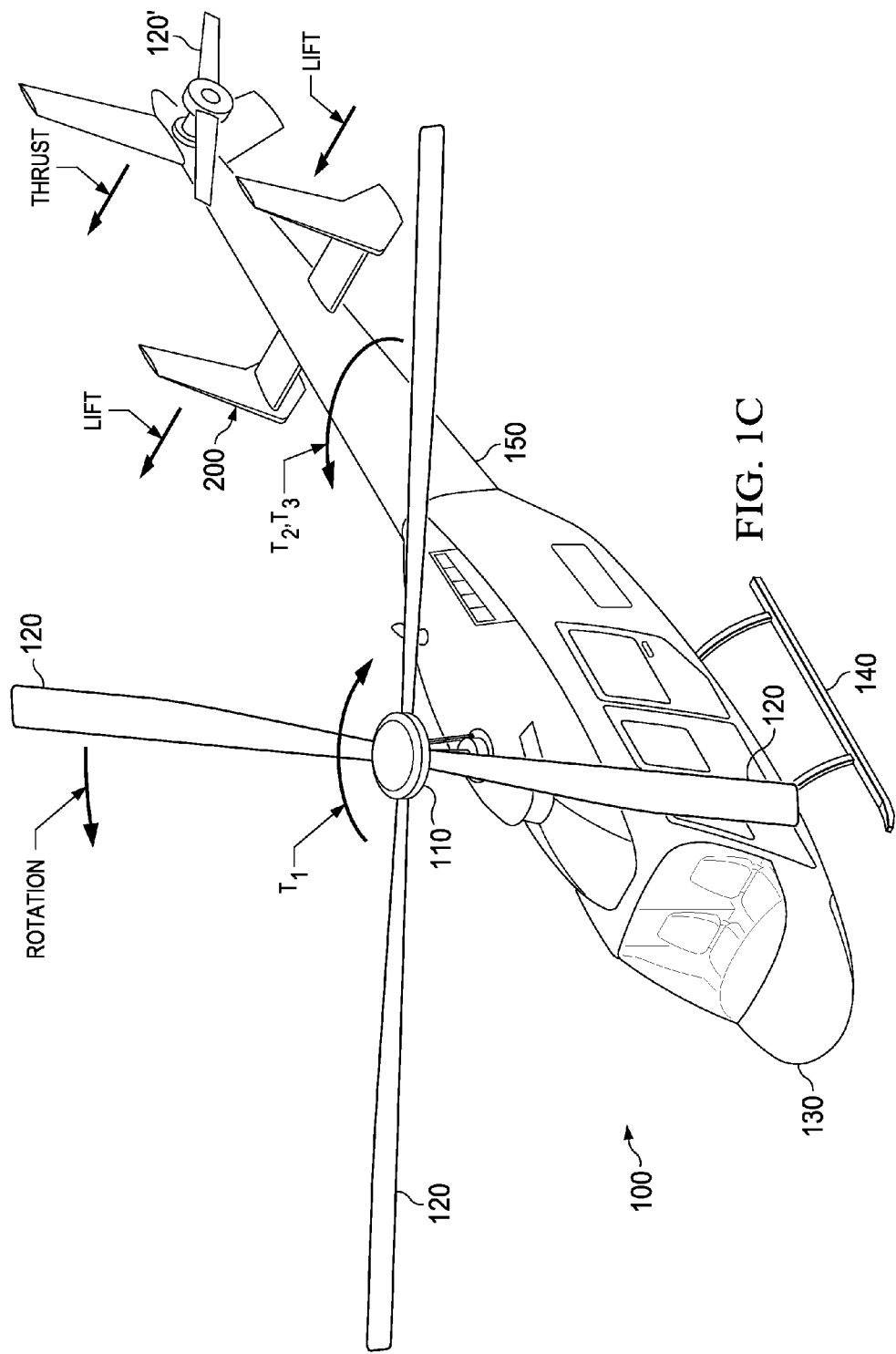
FIG. 1C shows a perspective view of the rotorcraft of FIG. 1A.

FIGS. 1A, 1B, and 1C show a rotorcraft 100 according to one example embodiment. FIG. 1A shows a side view of rotorcraft 100, FIG. 1B shows a top view of rotorcraft 100, and FIG. 1C shows a perspective view of rotorcraft 100.

In the example of FIGS. 1A, 1B, and 1C, rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments recognize that blades 120' may represent one example of an anti-torque rotor system; other examples may include, but are not limited to, tail propellers, ducted tail rotors, and ducted fans mounted inside and/or outside the rotorcraft.

Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

As shown in the example of FIGS. 1B and 1C, when main rotor blades 120 rotate, fuselage 130 counters with a torque T1 in the direction opposite to the rotational direction of blades 120. On the other hand, blades 120' may generate a thrust by, for example, rotating at a variable speed or pitch angle, to generate a force (or torque T2) in the direction opposite to that of torque T1. Terms such as "torque" and "force" may be used interchangeably throughout, seeing as how torque is generally a function of force and distance.

If the example rotorcraft 100 only featured main rotor blades 120 and one anti-torque system featuring blades 120', then rotorcraft 100 could maintain its heading by providing sufficient anti-torque such that T2=T1. To do so, a pilot may instruct rotorcraft 100 to increase rotation speed and/or pitch angle of blades 120' such that blades 120' generate sufficient torque T2 to maintain/control the yaw of rotorcraft 100.

Although blades 120' may be capable of generating sufficient torque T2, blades 120' may generate substantial noise under certain operating conditions. For example, tail-rotor noise may increase as tail-rotor blade tip speed increases. Therefore, tail-rotor noise may be reduced by reducing tail-rotor blade tip speed.

Reducing tail-rotor blade tip speed, however, may lead to other potential issues. For example, reducing tail-rotor blade tip speed may result in a loss of anti-torque force (T2) unless the pitch angle of the tail-rotor blades is increased. Increasing the pitch angle of the tail-rotor blades while reducing tail-rotor blade tip speed, however, may cause tail-rotor blade flapping during forward flight.

In general, tail-rotor blade flapping may occur when a tail-rotor blade generates less lift during the first half or a rotation and then generates more lift during the second half of a rotation. For example, the tip speed of a tail-rotor blade may be generally expressed as $\omega^* r \pm V$, wherein $\omega$ the number of revolutions per time interval (e.g., rpm), r represents the radius of a tail-rotor blade, and V represents the forward speed of the aircraft. In this example, the tip speed of a tail-rotor blade may be $\omega^* r - V$ for half of a rotation and then be ω*r+V for the other half of the rotation. Therefore, the lift generated by the tail-rotor blade may be smaller during the first half of the rotation (when tip speed is ω*r−V) and then be greater during the second half of the rotation (when tip speed is o*r+V) because lift increases as a function of tip speed. This difference in lift between the advancing tail-rotor blade and the retreating tail-rotor blade may cause the tail-rotor blade to push downwards during part of the rotation and lift higher during another part of the rotation (thus causing the tip path plane of the tail-rotor blades to tilt), a phenomena that may generally be referred to as tail-rotor flapping. The tail-rotor flapping angle may generally refer to angle between the perpendicular to the tail-rotor mast and the tilted tail-rotor tip path plane caused by differences in lift.

Different tail-rotor systems may have different levels of allowable tail-rotor flapping. Accordingly, tail-rotor flapping may limit the ability to reduce tail-rotor noise by increasing the pitch angle of the tail-rotor blades while reducing tail-rotor blade tip speed.

In some aircraft, the tail-rotor system is more rigid and may prevent tail-rotor flapping. Such aircraft, however, may have oscillatory load limits that, similar to tail-rotor flapping in other aircraft, may limit the ability to reduce tail-rotor noise by increasing the pitch angle of the tail-rotor blades while reducing tail-rotor blade tip speed. Accordingly, although some of the discussion contained herein refers to blade flapping issues, such issues may also extend to rigid tail-rotor systems and other anti-torque systems.

Tail-rotor flapping and/or oscillatory loads may be maintained/reduced by decreasing the pitch angle of the tail-rotor blades while reducing tail-rotor blade tip speed. Reducing both pitch angle and tip speed, however, may result in a loss of anti-torque force (T2). If the tip speed and pitch angle of blades 120' are reduced too low, then the tail-rotor system may not be capable of providing sufficient anti-torque T2 to counter the torque T1 generated by main rotor blades 120.

Accordingly, teachings of certain embodiments recognize the capability to provide an anti-torque rudder system 200. Teachings of certain embodiments recognize that a rudder system such as anti-torque rudder system 200 may allow tail-rotor noise to be reduced by providing additional anti-torque force. In addition, teachings of certain embodiments recognize that a rudder system such as anti-torque rudder system 200 may be more effective at generating anti-torque force at higher airspeeds than a tail-rotor system and therefore may improve aircraft efficiency and range.

Anti-torque rudder system 200 may generate a torque T3 in the same direction as torque T2 such that the equation T1=T2+T3 may be maintained even if torque T2 is reduced by, for example, reducing tail-rotor blade pitch angle or blade tip speed. In some embodiments, a lateral accelerometer or other device may be used to measure rotorcraft sideforce and maintain the equation T1=T2+T3.

Teachings of certain embodiments recognize that providing anti-torque rudder system 200 on rotorcraft 100 may result in lower tail-rotor noise, especially at higher aircraft airspeeds. For example, as explained above, reducing the tip speed and pitch angle of blades 120' may result in both lower tail-rotor noise and lower generated torque T2. Teachings of certain embodiments recognize that the torque T3 generated by anti-torque rudder system 200 may increase as aircraft airspeed increases, which may allow torque T2 to be reduced as torque T3 increases such that the equation T1=T2+T3 may be maintained. Accordingly, the increasing torque T3 generated by anti-torque rudder system 200 may allow tail-rotor noise to be reduced at higher aircraft airspeeds by allowing the tip speed and pitch angle of blades 120' to be reduced.

In the example of FIGS. 1A, 1B, and 1C, anti-torque rudder system 200 is coupled to empennage 150 of rotorcraft 100. Anti-torque rudder system 200 may feature at least one surface operable to provide a second force (in addition to the force provided by blades 120') in the direction of rotation of blades 120. In the example of FIGS. 1A, 1B, and 1C, anti-torque rudder system 200 features two such surfaces, although teachings of certain embodiments recognize that more or fewer surfaces may be provided.

Figure 2:
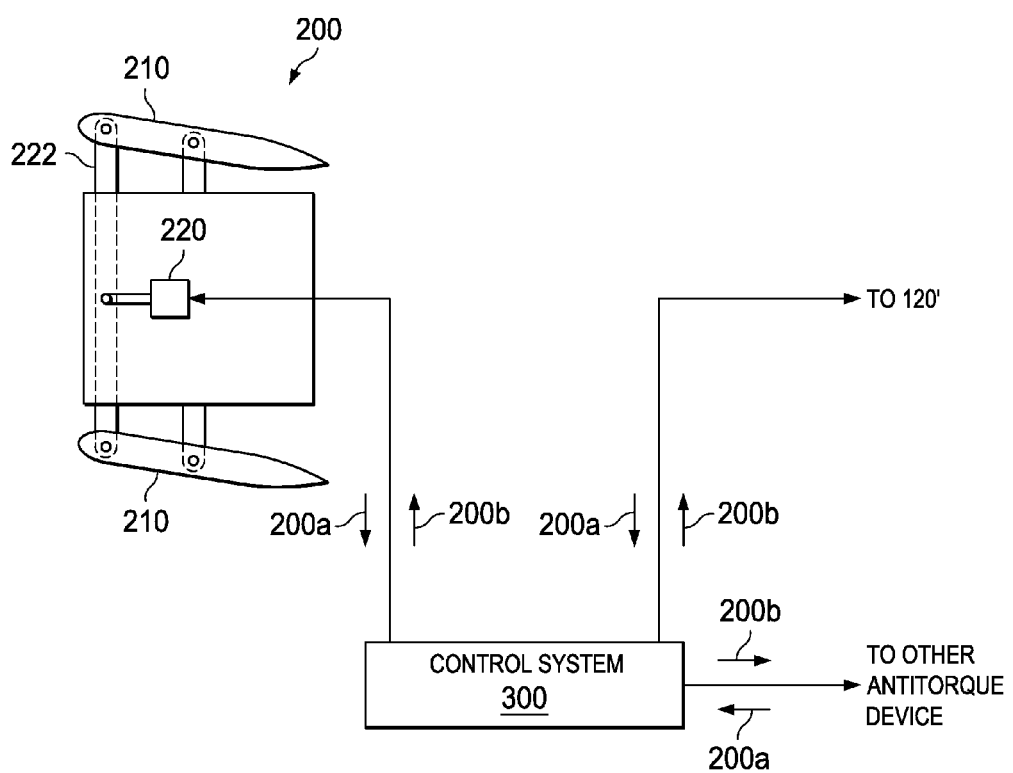
FIG. 2 shows a schematic view of the anti-torque rudder system of the rotorcraft of FIG. 1A according to one example embodiment.

FIG. 2 shows a schematic view of anti-torque rudder system 200 according to one example embodiment. In the example of FIG. 2, anti-torque rudder system 200 features rudder surfaces 210, an actuator 220, and a control rod 222. In operation, actuator 220 may adjust the deflection of rudder surfaces 210 by moving control rod 222. Teachings of certain embodiments recognize that adjusting the deflection of rudder surfaces 210 may change the amount of torque T3 generated by anti-torque rudder system 200.

As seen in the example of FIG. 2, anti-torque rudder system 200, tail-rotor system blades 120', and any other anti-torque devices may be controlled by a control system 300. For example, each anti-torque device may provide input information 200a to control system 300 and receive control commands 200b from control system 300. Teachings of certain embodiments recognize that control system 300 may send control commands 200b in an effort to control aircraft yaw.

Figure 3:
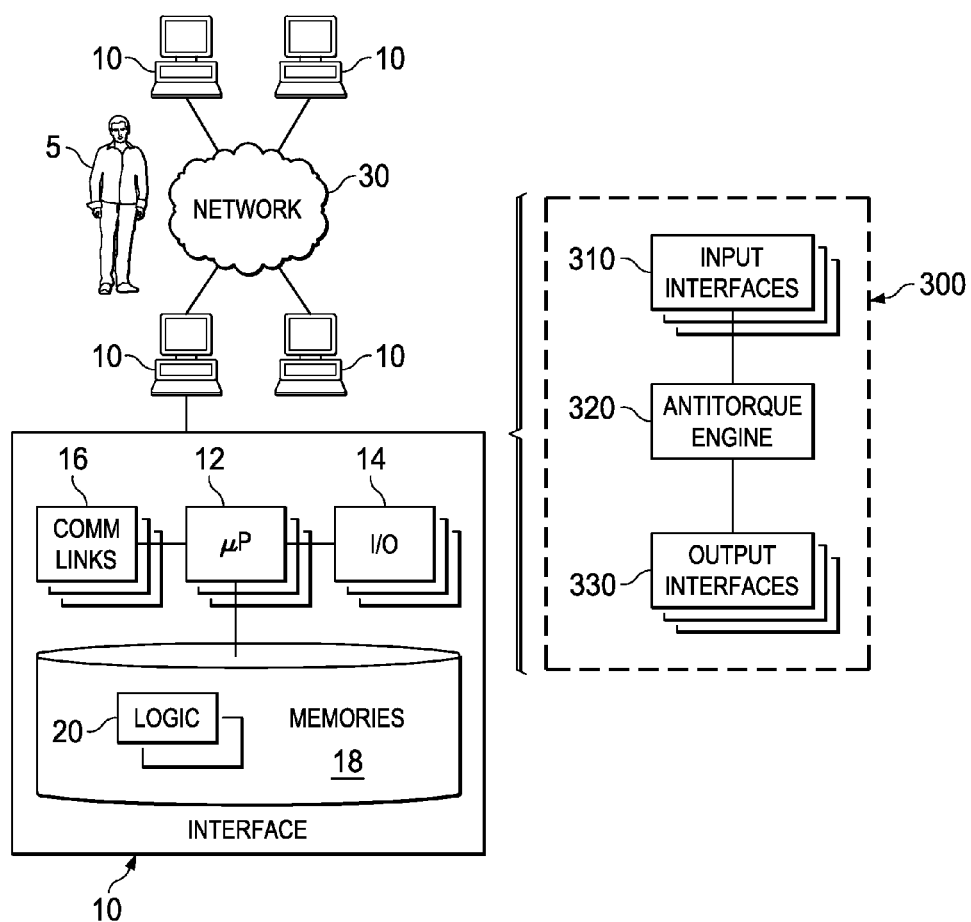
FIG. 3 shows a control system associated with the anti-torque rudder system of FIG. 2 according to one example embodiment.

FIG. 3 shows control system 300 according to one example embodiment. In the example of FIG. 3, system 300 features input interfaces 310, an anti-torque engine 320, and output interfaces 330, that may be implemented at least partially by one or more computer systems 10. All, some, or none of the components of system 300 may be located on or near rotorcraft 100 (or another aircraft). In some embodiments, system 300 may be in communication with or incorporated into a fly-by-wire flight control system.

Users 5 may access system 300 through computer systems 10. For example, in some embodiments, users 5 may access input interfaces 310 to provide yaw information to anti-torque engine 320, such as an instruction to turn rotorcraft 100 left or right. In general, users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Input interfaces 310 may receive inputs from a variety of sources. For example, input interfaces 310 may receive input information 200a from systems associated with anti-torque devices (e.g., blades 120' and rudder system 200). Such input information 200a may include, for example, information indicative of tail-rotor flapping or information indicative of the angle of attack of rudder surfaces 210. As another example, input interfaces 310 may receive pilot commands (e.g., a pilot yaw command transmitted as a result of the pilot pressing a foot down on a rudder pedal in the cockpit). As yet another example, input interfaces 310 may receive inputs from sensors associated with rotorcraft 100, such as airspeed sensors or density altitude sensors.

Anti-torque engine 320 generates anti-torque instructions and transmits the instructions to the anti-torque devices via output interfaces 330. For example, anti-torque engine 320 may generate control commands 200b and transmit the control commands 200b to control systems associated with blades 120' and anti-torque rudder system 200 via output interfaces 330.

In operation, according to some example embodiments, an input interface 310 receives a request to change an amount of generated anti-torque force. In one example embodiment, a pilot provides the request to change an amount of generated anti-torque force by, for example, pressing a foot down on a rudder pedal in the cockpit. In another example embodiment, a flight control system provides the request to change an amount of generated anti-torque force by, for example, transmitting a signal to the input interface 310 representative of the request.

The input interface 310 may receive a request to change an amount of generated anti-torque force for a variety of reasons. For example, the amount of generated anti-torque force may be changed to change the yaw of the aircraft. As another example, the amount of generated anti-torque force may be changed due to a change in outside conditions (e.g., increase in cross-wind speed). As yet another example, the amount of generated anti-torque force may be changed due to a change in aircraft operations. For example, as explained above, the torque T3 generated by anti-torque rudder system 200 will increase if the relative airspeed of rotorcraft 100 increases. In this example, it may be necessary to change the amount of torque T2 or torque T3 generated so as to maintain the equation $T1=T2+T3$.

In addition to receiving the request to change an amount of generated anti-torque force, an input interface 310 may also receive, for example, information indicative of a rotorcraft performance parameter. In some example embodiments, anti-torque engine 320 may compare the rotorcraft performance parameter to a threshold value.

Teachings of certain embodiments recognize that anti-torque engine 320 may send instructions via output interfaces 330 to change the amount of torque generated by blades 120' and/or anti-torque rudder system 200 depending on whether the rotorcraft performance parameter is greater than or less than the threshold value. Instructions to change the amount of torque T2 generated by blades 120' may include, but are not limited to, instructions to change a pitch angle of blades 120' and/or a rotation speed of blades 120'. Instructions to change the amount of torque T3 generated by anti-torque rudder system may include, but are not limited to, instructions to change an angle of attack of rudders 210.

In some embodiments, the rotorcraft performance parameter is a parameter indicative of flapping of blades 120'. Parameters indicative of flapping may include, but are not limited to, measurements of blade flapping (e.g., using Hall-effect sensors or other measurement devices) or other parameters that may allow for estimations of blade flapping using look-up tables or other techniques (for example, blade flapping may be estimated if relative airspeed, blade speed, blade pitch angle, and/or other information is known).

In one example embodiment, anti-torque engine 320 may respond to the request to change the amount of generated anti-torque force by sending instructions via output interfaces 330 to change the amount of torque generated by blades 120' and/or anti-torque rudder system 200 depending on whether flapping of blades 120' exceeds a threshold. For example, if the request represents a request to increase the total amount of anti-torque force generated and flapping of blades 120' is less than a threshold value, then anti-torque engine 320 may send instructions via output interface 330 to increase the amount of torque T2 generated by blades 120'. In this example, anti-torque engine 320 may recognize that the torque T2 generated by blades 120' may be increased or decreased somewhat without flapping of blades 120' exceeding the threshold.

If, on the other hand, the request represents a request to increase the total amount of anti-torque force generated but flapping of blades 120' already exceeds a threshold value, then anti-torque engine 320 may send instructions via output interface 330 to increase the amount of torque T3 generated by anti-torque rudder system 200. In some embodiments, anti-torque engine 320 may send two sets of instructions via output interface 330: a first set of instructions to decrease the amount of torque T2 generated by blades 120' and a second set of instructions to increase the amount of torque T3.

In another example, the request to change the amount of generated anti-torque force may represent a request to change the amount of torque T2 generated by blades 120' such that flapping of blades 120' is maintained below the threshold value. In this example, anti-torque engine 320 may send instructions via output interface 330 to decrease the amount of torque T2 generated by blades 120' if flapping of blades 120' exceeds the threshold. These instructions may include, for example, instructions to reduce the blade tip speed and/or blade pitch of blades 120'. If, in this example, the flapping of blades 120' is already maintained less than the threshold value, anti-torque engine 320 may increase or decrease the amount of torque T3 generated by anti-torque rudder system 200 so as to maintain the equation T1=T2+T3 during forward flight.

In some embodiments, the rotorcraft performance parameter is an airspeed of rotorcraft 100. Examples of an airspeed of rotorcraft 100 may include, but are not limited to, indicated airspeed, calibrated airspeed, and true airspeed. Airspeed of an aircraft may generally represent the speed of the aircraft relative to the air (relative airspeed) and may account for movement of the air (e.g., relative wind). Airspeed of an aircraft may also include ground speed, which may represent the speed of the aircraft of the ground rather than through the air, which can itself be moving.

As explained above, blade flapping may increase as a function of increasing airspeed. In addition, as explained above, blades 120' may operate as the primary anti-torque device at lower airspeeds, whereas anti-torque rudder system 200 may operate as the primary anti-torque device at higher airspeeds because, among other reasons, (1) flapping of blades 120' is higher at higher airspeeds (if the blade pitch and rotation speed is not adjusted) and (2) rudders 210 are more effective at generating anti-torque at higher airspeeds. Accordingly, teachings of certain embodiments recognize the ability to improve anti-torque performance, reduce tail-rotor noise, and minimize tail-rotor flapping by adjusting torque T2 generated by blades 120' at lower airspeeds and adjusting torque T3 generated by anti-torque rudder system 200 at higher airspeeds. If, for example, the aircraft airspeed is less than a threshold value, anti-torque engine 320 may send instructions via output interfaces 330 to change the amount of torque T2 generated by blades 120'. If, on the other hand, the aircraft airspeed is greater than the threshold value, anti-torque engine 320 may send instructions via output interfaces 330 to change the amount of torque T3 generated by anti-torque rudder system 200.

In some embodiments, the rotorcraft performance parameter is a parameter indicative of the torque T2 generated by blades 120'. Teachings of certain embodiments recognize that tail-rotor noise may be reduced by minimizing the value of torque T2 during operation (such as by minimizing tail-rotor blade pitch angle or tip speed). Teachings of certain embodiments recognize, however, that torque T2 should still be great enough that the equation T1=T2+T3 may be maintained across a variety of flight conditions.

In one example embodiment, the parameter is indicative of whether blades 120' are capable of generating a sufficiently large torque T2 under a set of flight conditions such that blades 120' and anti-torque rudder system 200, in combination, are capable of maintaining the equation T1=T2+T3 if the torque T2 generated by blades 120' is minimized. Such may be the case, for example, if the torque T3 generated by tail-rotor rudder system 200 is sufficiently high such that the equation T1=T2+T3 may be maintained even if the torque T2 generated by blades 120' is minimized. The torque T2 generated by blades 120' may be minimized, for example, by minimizing a pitch angle of blades 120' or minimizing a rotation speed of blades 120'. These operating conditions may be minimized, for example, by lower their values to respective minimum values (e.g., a minimum operating blade pitch or a minimum operating rotation speed).

In a similar example embodiment, the parameter is indicative of whether blades 120' and anti-torque rotor system 200 are capable of generating, in combination, a sufficiently large total anti-torque T2+T3 under a set of flight conditions such that blades 120' and anti-torque rudder system 200, in combination, are capable of maintaining the equation T1=T2+T3 if the torque T2 generated by blades 120' is minimized and the torque T3 generated by anti-torque rotor system 200 is maximized. The torque T3 generated by anti-torque rotor system 200 may be maximized, for example, by maximizing the angle of attack of rudders 210.

If, in this example, the total anti-torque T2+T3 is greater than or equal to T1 when the torque T2 is minimized and torque T3 is maximized, then it may be assumed that the yaw of rotorcraft 100 may be maintained/controlled by changing the amount of torque T3 generated (while potentially leaving torque T2 minimized). Accordingly, in this example, anti-torque engine 320 may send, in response to a request to change the amount of generated anti-torque force, instructions to change the amount of torque T3 generated by anti-torque rudder system 200. If, on the other hand, the total anti-torque T2+T3 is less than T1 when the torque T2 is minimized and torque T3 is maximized, then anti-torque engine 320 may send instructions to change the amount of torque T2 generated by blades 120'.

In each of these scenarios, the rotorcraft performance parameter and the threshold value may be defined in a variety of ways. Returning to the most recent example, the rotorcraft performance parameter may be defined as the maximum torque T3 under certain flight conditions, and the threshold value may be defined as the value of T1-T2 under certain flight conditions when the torque T2 is minimized (or, alternatively, when the torque T2 is low enough such that tail-rotor noise or tail-rotor flapping meets certain criteria). As another example, the rotorcraft performance parameter may be defined as the total torque T2+T3 when torque T3 is maximized and torque T2 is minimized, and the threshold value may be defined as the value of T1.

In some circumstances, whether the rotorcraft performance parameter is less than or greater than the threshold value may change based on operation of rotorcraft 100. For example, consider rotorcraft 100 hovering over a certain location. In this example, rotorcraft 100 has little to no forward airspeed. Thus, tail-rotor flapping is relatively low. In addition, the torque T3 generated by anti-torque rudder system 200 is relatively low because rudders 210 generate little to no lift when rotorcraft 100 is hovering.

When rotorcraft 100 is hovering over a certain location, rotorcraft performance parameters such as tail-rotor flapping, aircraft airspeed, and the value of torque T3 (e.g., max torque T3) may be relatively low and thus likely to be less than their corresponding threshold values. If rotorcraft 100 begins to accelerate forward, however, such rotorcraft performance parameters may begin to increase. Eventually, the rotorcraft performance parameter will exceed the threshold value as rotorcraft 100 continues to accelerate. Once the rotorcraft performance parameter exceeds the threshold value, it may become necessary to change operation of the anti-torque systems (e.g., reduce tail-rotor flapping or begin controlling rotorcraft yaw with rudders 210 rather than blades 120').

Operation procedures may be developed to control how blades 120' and anti-torque rudder system 200 should operate during various operation phases of rotorcraft 100 based on the comparison between the rotorcraft performance parameter and the threshold value. In one example embodiment, the rotorcraft performance parameter may be defined as airspeed, and the threshold value may be a specified airspeed value (e.g., 60 knots).

In this example, if rotorcraft 100 is in a hover phase, anti-torque engine 320 may instruct anti-torque rudder system 200 to deflect rudders 210 at maximum angle of attack (thus maximizing torque T3) and may change operation of blades 120' as necessary to control the yaw of rotorcraft 100. As rotorcraft 100 begins forward flight (e.g., at speeds less than the specified airspeed value), anti-torque engine 320 may continue to maintain rudders 210 at maximum angle of attack (thus maximizing torque T3) and may change operation of blades 120' as necessary to control the yaw of rotorcraft 100 (e.g., to minimize lateral acceleration during forward flight). In both of these scenarios (hover flight and forward flight less than a certain speed), airspeed is less than the specified airspeed value. Accordingly, anti-torque engine 320 may change tail-rotor blade pitch and/or speed as necessary both to counteract the torque T1 generated by main rotor blades 120 and to implement yaw changes requested by the pilot when the pilot steps on a rudder pedal in the cockpit.

If rotorcraft 100 increases speed such that the airspeed is greater than the specified airspeed value, anti-torque engine 320 may change the mode of operation. For example, if the airspeed is greater than the specified airspeed value, anti-torque engine 320 may minimize tail-rotor blade speed and/or pitch (thus minimizing torque T2) and change the angle of attack of rudders 210 as necessary to control the yaw of rotorcraft 100.

Teachings of certain embodiments recognize that anti-torque engine 320 may consult more than one threshold value. For example, in one embodiment, first and second threshold values may be consulted. In this example, blades 120' may represent the primary anti-torque system if the rotorcraft performance parameter is below the first threshold, and anti-torque rudder system 200 may represent the primary anti-torque system if the rotorcraft performance parameter is greater than the second threshold. If the rotorcraft performance parameter is between the first and second thresholds, however, then anti-torque engine 320 may issue commands to both blades 120' and the anti-torque rudder system 200.

Teachings of certain embodiments also recognize that anti-torque engine 320 may operate in cooperation with a stability and control augmentation system (SCAS). A SCAS may augment the stability of the aircraft by, for example, using various control surfaces to improve stability of the aircraft. A SCAS may also improve pilot control of the aircraft by, for example, automatically implementing some flight control commands (e.g., holding a heading without requiring the pilot to continuously compensate for heading changes).

In one example embodiment, anti-torque engine 320 may implement yaw-rate damping commands through blades 120' and/or rudders 210. For example, in an SCAS, rudders 210 may operate as a (slow) trim actuator, and tail-rotor actuator associated with blades 120' may operate as a (fast) SCAS actuator capable of making rapid blade angle changes. In some embodiments, the tail-rotor SCAS may have limited authority for rate damping, whereas rudders 210 may maintain the SCAS near the center of the desired tail-rotor blade angle range as determined by flapping requirements.

In some embodiments, SCAS may be implemented using anti-torque engine 320 by referring to various threshold values, as described above. In other embodiments, however, SCAS may represent an exception to performance parameter rules, such as the performance parameter rules set forth above. For example, anti-torque engine 320 may implement fast SCAS commands using blades 120' even if rudders 210 would normally be used to implement yaw commands (because, for example, the performance parameter exceeds the threshold value).

As explained above, teachings of certain embodiments recognize that providing anti-torque rudder system 200 may help reduce/minimize blade flapping in an anti-torque rotor system such as the anti-torque rotor system of rotorcraft 100. In addition, reducing/minimizing tail-rotor blade flapping may also allow for additional tail-rotor improvements. For example, teachings of certain embodiments recognize that providing an anti-torque rudder system 200 may improve performance of a thrust ring or other anti-torque rotor enhancement system.

Figure 4:
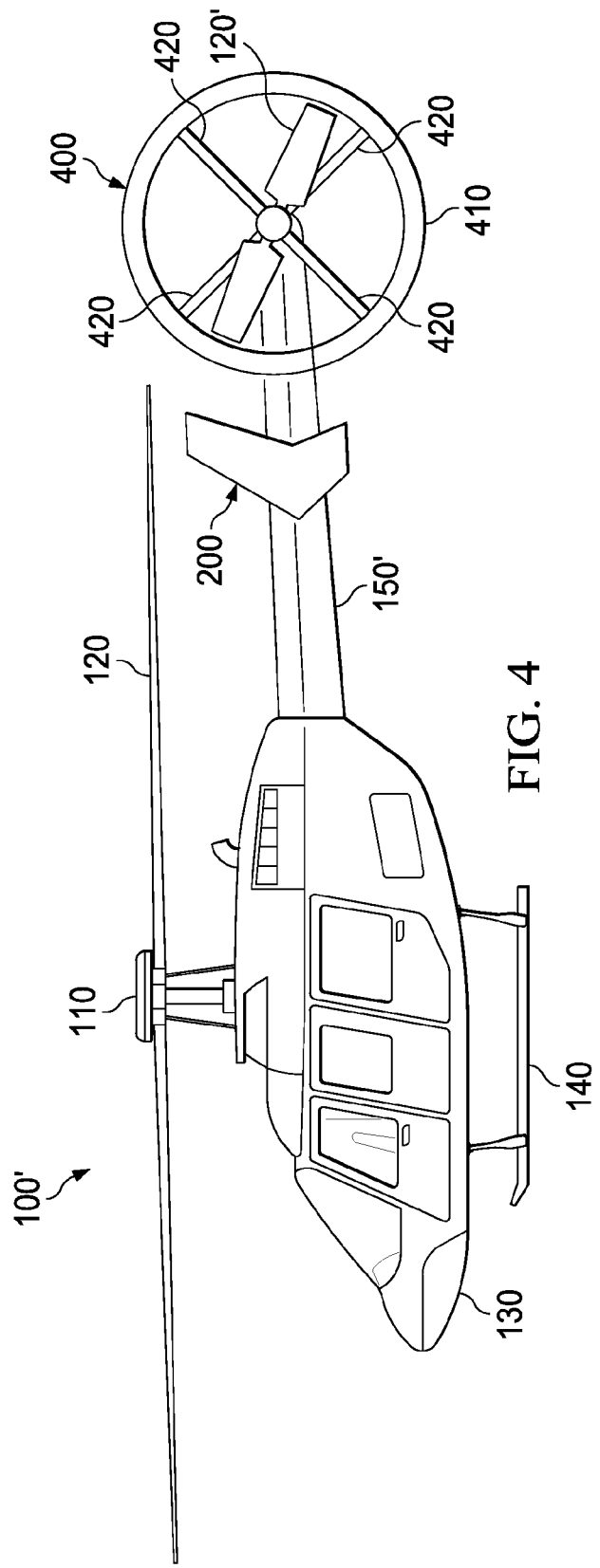
FIG. 4 shows a side view of a rotorcraft according to an alternative embodiment.

FIG. 4 shows a rotorcraft 100' featuring an anti-torque rotor enhancement system 400 according to one example embodiment. Anti-torque rotor enhancement system 400 features an aerodynamic structure 410 and braces 420. In some embodiments, anti-torque rotor enhancement system may resemble a thrust ring such as the thrust rings described in U.S. Pat. No. 4,506,849, issued on Mar. 26, 1985. U.S. Pat. No. 4,506,849 is incorporated in its entirety.

In the example of FIG. 4, aerodynamic structure 410 is a ring in the shape of a thin substantially planar annular airfoil and is mounted parallel to and slightly downstream from the blades 120'. Aerodynamic structure 410 is supported on empennage 150 by fixed braces 420.

Teachings of certain embodiments recognize that aerodynamic structure 410 may provide a number of advantages over a conventional tail rotor structure which includes a vertical fin located adjacent blades 120'. For example, a conventional fin may partially block the wake produced by a tail rotor while aerodynamic structure 410 may permit the wake to pass through the central opening without obstruction. Aerodynamic structure 410 may have sufficient lateral area to provide the transverse stability provided by a standard vertical fin. The vortices produced at the tips of blades 120' may be captured in the region adjacent the downstream surface of aerodynamic structure 410. The captured vortices may form a circulating air pattern which acts as a pump to draw additional air through the center of aerodynamic structure 410 from the region adjacent the upstream surface of the ring. The circulating air pattern may increase the diameter of the wake and the volume of air transported by blades 120'. The wake of blades 120' may be transported at a slower rate but comprises a greater mass of air by the operation of aerodynamic structure 410, thus potentially resulting in increased efficiency in the operation of blades 120'.

Aerodynamic structure 410 may further reduce the noise level of blades 120'. The increased wake produced by blades 120' as a result of aerodynamic structure 410 may increase the total lift provided by blades 120. In addition, control of the tail rotor vortices may reduce the vibration of rotorcraft 100', which can be caused by the interaction of the main rotor down wash with the vortices produced by the tail rotor.

Furthermore, teachings of certain embodiments recognize that the directional stability afforded the pilot of rotorcraft 100' may be enhanced by the operation of thrust aerodynamic structure 410 so that the pilot has a greater "feel" for the sidewise control of the aircraft.

Aerodynamic structure 410 may further serve as a guard about blades 120' to reduce the instance of injury to ground personnel and to prevent the loss of aircraft due to the contact of an exposed rotor with obstacles such as trees and power lines.

Although aerodynamic structure 410 may provide these and other benefits under certain conditions, the noise-reduction efficiency of aerodynamic structure 410 may be limited due to tail-rotor flapping. Tail-rotor flapping may disrupt, for example, the control of tail-rotor vortices provided by aerodynamic structure 410 and may limit the ability of aerodynamic structure 410 to suppress noise generated by blades 120'. For example, aerodynamic structure 410 may be less effective in suppressing noise generated by blades 120' if blade flapping causes the plane of the tail-rotor blade tip path of blades 120' to move away from aerodynamic structure 410.

Accordingly, teachings of certain embodiments recognize that providing an anti-torque rudder such as anti-torque rudder system 200 may improve performance of a tail-rotor enhancement system such as anti-torque rotor enhancement system 400. Teachings of certain embodiments recognize that providing both an anti-torque rudder such as anti-torque rudder system 200 and a tail-rotor enhancement system such as anti-torque rotor enhancement system 400 may allow for better rotorcraft performance as compared to only providing one or the other.

Returning to the example of FIG. 4, aerodynamic structure 410 is offset slightly from blades 120', and the opening in the thrust ring is larger than the diameter of blades 120'. Teachings of certain embodiments recognize that aerodynamic structure 410 may guard blades 120' by protecting ground personnel and preventing blades 120' from being damaged on the ground and during flight (such as due to striking objects such as trees and power lines). Contact with an unguarded tail rotor may seriously damage the rotor causing the helicopter to be uncontrollable, which can result in loss of the aircraft. Aerodynamic structure 410 provides substantial protection for the rotor and can even be distorted by impact without interfering with the tail rotor since the ring is offset a short distance from the plane of the rotor.

In one example embodiment, the plane of aerodynamic structure 410 is placed downstream from the plane of blades 120' a distance equal to 0.05 of the radius of blades 120'. The chord length of aerodynamic structure 410 is, in some embodiments, in the range of 0.2 to 0.25 of the radius of the rotor. The central opening of aerodynamic structure 410 may be slightly larger than the diameter of blades 120'. The cross section of aerodynamic structure 410 may an airflow shape such as a NACA 23015. However, other shapes such as a flat plate or circular cross section may also be functional.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
  a body;
  a power train coupled to the body and comprising a power source and a drive shaft coupled to the power source;
  a main rotor system coupled to the power train, the main rotor system comprising at least one main rotor blade;
  an anti-torque rotor system coupled to the body, the anti-torque rotor system comprising at least one anti-torque rotor blade operable to provide a first force on the body in the direction of rotation of the at least one main rotor blade;
  an anti-torque rotor enhancement system, comprising:
    an aerodynamic structure having an opening therethrough and an airfoil surface; and
    a support structure coupling the aerodynamic structure to the body such that the opening is positioned proximate to a rotation path of the at least one anti-torque rotor blade; and
  an anti-torque rudder system coupled to the body, the anti-torque rudder system comprising at least one rudder surface operable to provide a second force on the body in the direction of rotation of the at least one main rotor blade.

2. The rotorcraft of claim 1, wherein the plane of the airfoil surface is substantially parallel to the plane of the rotation path of the at least one anti-torque rotor blade.

3. The rotorcraft of claim 1, wherein the airfoil surface has a chord of up to 25% of the radius of the rotation path of the at least one anti-torque rotor blade and a thickness of approximately 15% of the chord.

4. The rotorcraft of claim 1, wherein the opening has an inner diameter slightly greater than the diameter of the rotation path of the at least one anti-torque rotor blade.

5. The rotorcraft of claim 1, wherein the support structure couples the aerodynamic structure to the body such that the opening is downstream from the anti-torque rotor system.

6. The rotorcraft of claim 1, wherein the support structure couples the aerodynamic structure to the body such that the opening is substantially coaxial with the axis of rotation of the at least one anti-torque rotor blade.

7. The rotorcraft of claim 1, wherein the support structure couples the aerodynamic structure to the body such that the plane of the aerodynamic structure is substantially parallel to the plane of the rotation path of the at least one anti-torque rotor blade such that the aerodynamic structure captures at least some vortices produced in the wash of the at least one anti-torque rotor blade during rotation of the at least one anti-torque rotor blade.

8. The rotorcraft of claim 1, wherein the anti-torque rotor system comprises a tail rotor system.

9. The rotorcraft of claim 1, wherein the at least one rudder surface is an airfoil shape.

10. A method of providing anti-torque force in a rotorcraft, comprising:
providing, from an anti-torque rotor system coupled to a body of a rotorcraft, a first force on the body of the rotorcraft in the direction of rotation of at least one main rotor blade associated with the rotorcraft, the anti-torque rotor system comprising at least one anti-torque rotor blade;
providing, from an anti-torque rudder system coupled to the body, a second force on a body of a rotorcraft in the direction of rotation of at least one main rotor blade associated with the rotorcraft, the anti-torque rudder system comprising at least one rudder surface; and
capturing at least some vortices produced in the wash of the at least one anti-torque rotor blade during rotation of the at least one anti-torque rotor blade comprises providing an aerodynamic structure having an airfoil surface and an opening therethrough such that the opening is positioned proximate to a rotation path of the at least one anti-torque rotor blade.

11. The method of claim 10, wherein the plane of the airfoil surface is substantially parallel to the plane of the rotation path of the at least one anti-torque rotor blade.

12. The method of claim 10, wherein the airfoil surface has a chord of up to 25% of the radius of the rotation path of the at least one anti-torque rotor blade and a thickness of approximately 15% of the chord.

13. The method of claim 10, wherein the opening has an inner diameter slightly greater than the diameter of the rotation path of the at least one anti-torque rotor blade.

14. The method of claim 10, wherein the aerodynamic structure is provided such that the opening is downstream from the anti-torque rotor system.

15. The method of claim 10, wherein the aerodynamic structure is provided such that the opening is substantially coaxial with the axis of rotation of the at least one anti-torque rotor blade.

16. The method of claim 10, wherein the anti-torque rotor system comprises a tail rotor system.

17. The method of claim 10, wherein the at least one rudder surface is an airfoil shape.

* * * * *